United States Patent
Giraldi et al.

(10) Patent No.: US 9,512,947 B2
(45) Date of Patent: Dec. 6, 2016

(54) SAFETY CONNECTOR

(71) Applicants: Natalino Giraldi, Bronx, NY (US); Mark O'Brien, Bronx, NY (US)

(72) Inventors: Natalino Giraldi, Bronx, NY (US); Mark O'Brien, Bronx, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 389 days.

(21) Appl. No.: 14/156,640

(22) Filed: Jan. 16, 2014

(65) Prior Publication Data

US 2014/0197628 A1 Jul. 17, 2014

Related U.S. Application Data

(60) Provisional application No. 61/753,240, filed on Jan. 16, 2013.

(51) Int. Cl.
*F16L 35/00* (2006.01)
*F16L 3/10* (2006.01)
*F16L 3/12* (2006.01)

(52) U.S. Cl.
CPC ............... *F16L 35/00* (2013.01); *F16L 3/105* (2013.01); *F16L 3/1203* (2013.01)

(58) Field of Classification Search
CPC .......... F16L 35/00; F16L 3/105; F16L 3/1016; F16L 3/1091; F16L 3/1215; F16L 3/1203; F16L 23/08
USPC ............................ 285/87, 242–245, 367, 420
See application file for complete search history.

(56) References Cited

U.S. PATENT DOCUMENTS

| | | | | |
|---|---|---|---|---|
| 249,766 A * | 11/1881 | Hunt | ......................... | F16L 37/18 24/273 |
| 837,538 A * | 12/1906 | Biery | ....................... | F16L 37/18 285/242 |
| 900,974 A * | 10/1908 | Andrews | ................ | F16L 33/222 285/243 |
| 3,153,548 A * | 10/1964 | Speakman | .............. | F16L 37/20 24/517 |
| 3,695,635 A * | 10/1972 | Paddington | .......... | F16L 37/1205 285/320 |
| 5,522,625 A * | 6/1996 | Flick | ........................ | F16L 23/10 24/279 |
| 5,704,655 A * | 1/1998 | Lemburg | ................. | F16L 35/00 285/80 |
| 5,863,079 A * | 1/1999 | Donais | ..................... | F16L 37/18 285/312 |
| 6,089,619 A * | 7/2000 | Goda | ........................ | F16L 37/18 285/312 |
| 7,025,390 B2 * | 4/2006 | Knowles | .................. | F16L 33/22 285/242 |
| 7,290,805 B2 * | 11/2007 | Wu | ........................... | F16L 23/06 285/364 |

(Continued)

*Primary Examiner* — Rodney Mintz
(74) *Attorney, Agent, or Firm* — Cantor Colburn LLP

(57) ABSTRACT

A connector for use with a coupled first hose and second hose, the second hose including a hose fastener is provided including a connector body configured to mount to a first hose end. An arm extends generally perpendicularly from the connector body. A front side of the arm has a first end arranged at an angle to the arm. The first end of the arm is configured to engage a portion of the hose fastener. A back side of the arm has a biasing mechanism extending therefrom. The arm is pivotally mounted to the connector.

16 Claims, 4 Drawing Sheets

(56) References Cited

U.S. PATENT DOCUMENTS

| | | | | |
|---|---|---|---|---|
| 8,083,265 B1* | 12/2011 | Chen | ............... | F16L 37/18 285/312 |
| 8,240,718 B2* | 8/2012 | Morton | ............... | F16L 23/036 285/312 |
| 8,832,910 B2* | 9/2014 | Lah | ............... | A63C 11/221 24/19 |
| 8,876,169 B2* | 11/2014 | Chen | ............... | F16L 37/18 285/312 |
| 2005/0126612 A1* | 6/2005 | Chen | ............... | A45B 9/00 135/16 |
| 2005/0248098 A1* | 11/2005 | Sisk | ............... | F16L 21/06 277/616 |
| 2005/0275254 A1* | 12/2005 | Anderson | ............... | B62J 1/08 297/195.1 |
| 2006/0066099 A1* | 3/2006 | Inoue | ............... | F16L 33/222 285/245 |
| 2010/0327576 A1* | 12/2010 | Linhorst | ............... | F16L 25/12 285/38 |
| 2011/0316272 A1* | 12/2011 | Chen | ............... | F16L 37/18 285/312 |
| 2013/0020795 A1* | 1/2013 | Giraldi | ............... | F16L 19/065 285/24 |
| 2013/0106095 A1* | 5/2013 | Chen | ............... | F16L 37/18 285/85 |
| 2013/0312231 A1* | 11/2013 | Lah | ............... | A63C 11/221 24/457 |
| 2014/0001755 A1* | 1/2014 | Ogami | ............... | F16L 33/225 285/421 |
| 2016/0186902 A1* | 6/2016 | Lee | ............... | F16L 21/06 285/420 |

\* cited by examiner

SAFETY CONNECTOR

CROSS-REFERENCE TO RELATED APPLICATIONS

The present application is a nonprovisional application of U.S. Provisional Application 61/753,240 entitled "Safety Connector" filed on Jan. 16, 2013, the contents of which is incorporated by reference herein in its entirety.

BACKGROUND OF THE INVENTION

The subject matter disclosed herein generally relates to a hose coupling mechanism, and more particularly, to a hose coupling mechanism that prevents separation of coupled hoses when the hoses are in use.

In work areas where pressurized fluid or compressed air is delivered through hoses coupled with quick disconnect connectors, the connectors or the hoses themselves may become uncoupled as a result of vibrations generated by the fluid flowing through the hoses or from equipment being used nearby. An undesirable situation can occur when the hoses become disconnected, because at least one hose end tends to flail as a result of the pressurized fluid flowing there through. To prevent this, a hose whip having a relatively short length extends from one hose end to the adjacent hose end. Though a hose whip limits the movement of the two hose ends relative to one another if they are separated, the whip does not prevent the hose ends from separating or flailing on a smaller scale.

Accordingly, while existing hose retention methods are suitable for their intended purposes the need for improvement remains in preventing the separation of the coupled hose ends.

SUMMARY OF THE INVENTION

According to one embodiment of the invention, a connector for use with a coupled first hose and second hose, the second hose including a hose fastener is provided including a connector body configured to mount to a first hose end. An arm extends generally perpendicularly from the connector body. A front side of the arm has a first end arranged at an angle to the arm. The first end of the arm is configured to engage a portion of the hose fastener. A back side of the arm has a biasing mechanism extending therefrom. The arm is pivotally mounted to the connector.

According to one embodiment of the invention, a hose assembly is provided including a first hose end and a second hose end. The second hose end includes a hose fastener. The first hose end and the second hose end are connected with a coupling mechanism. A connector is mounted to the first hose end. The connector includes a connector body configured to attach to the first hose end. An arm is pivotally mounted to the connector body and extends generally perpendicularly therefrom. The arm includes a front side having a first end configured to engage a portion of the hose fastener. The arm also includes a back side having a biasing mechanism extending therefrom such that a free end of the biasing mechanism contacts a surface of the first hose end.

DETAILED DESCRIPTION OF THE INVENTION

Figure 1:
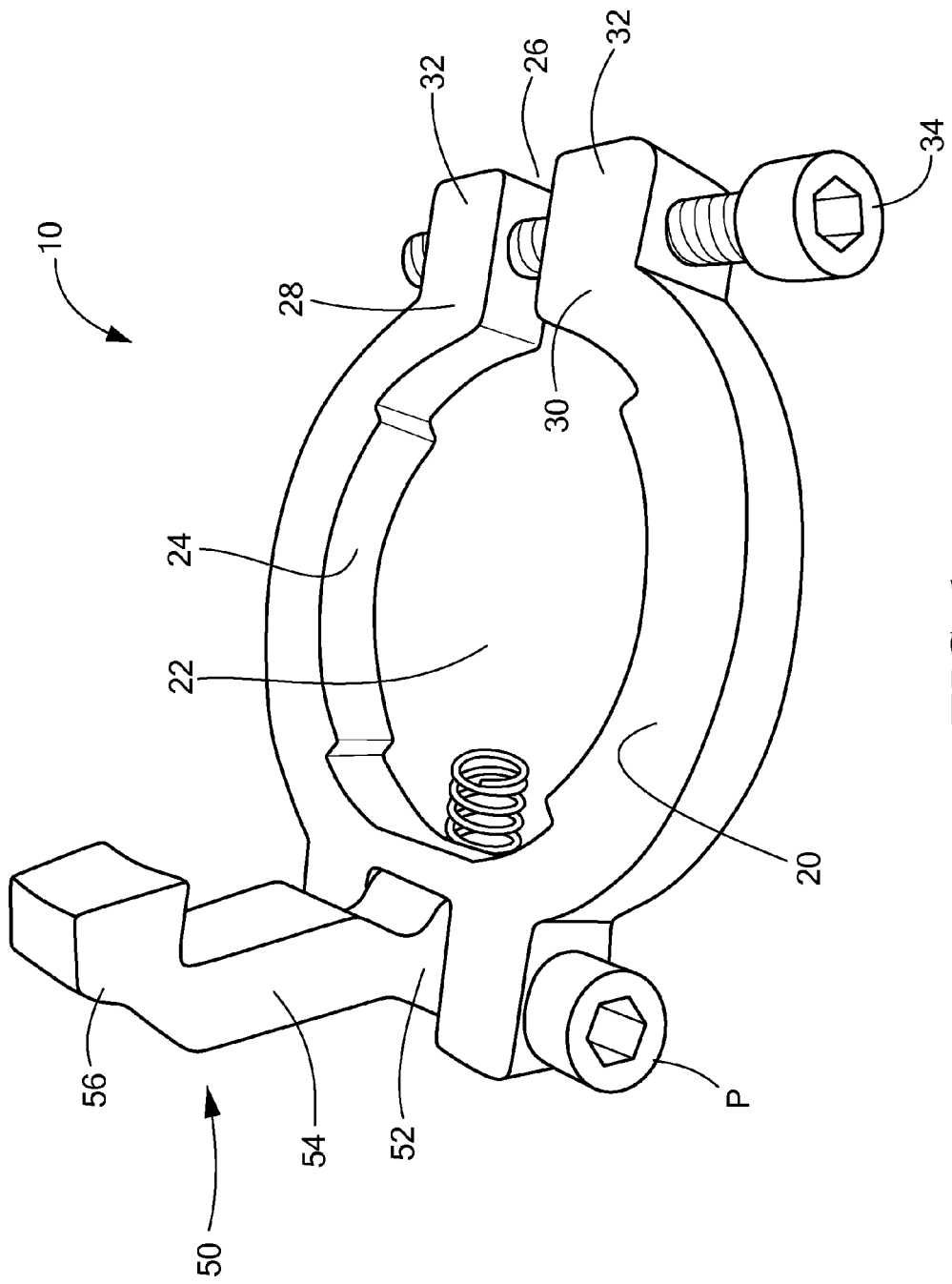
FIG. 1 is a perspective view of a connector intended to prevent separation of a coupled first hose end and second hose, in accordance with an embodiment of the invention.

Referring to the FIGS., a connector 10 for preventing separation of a coupled first hose end 12 and second hose end 14 is illustrated. The connector 10 includes a connector body 20 configured to mount to the first hose end 12. In one embodiment, the connector body is formed from a metal material, such as steel for example. The connector body 20 has a central hole 22 through which the first hose end 12 extends such that the connector body 20 substantially surrounds the periphery of the first hose end 12. The contour of the central hole 22 is generally complementary to the shape of the first hose end 12. As a result, the entire interior surface 24 of the connector body 20, or at least a portion thereof, contacts the first hose end 12 when installed thereon.

As illustrated in FIG. 1, the connector body 20 may be formed as a single piece having an opening 26 through which the first hose end 12 is inserted, similar to a snap ring for example. The ends 28, 30 of the connector body 20, adjacent the opening 26, include a pair of flanges 32 arranged on opposing sides of the opening 26. The flanges 32 are configured to receive a fastener 34, such as a screw for example, to secure the connector body 20 about the first hose end 12.

Figure 2:
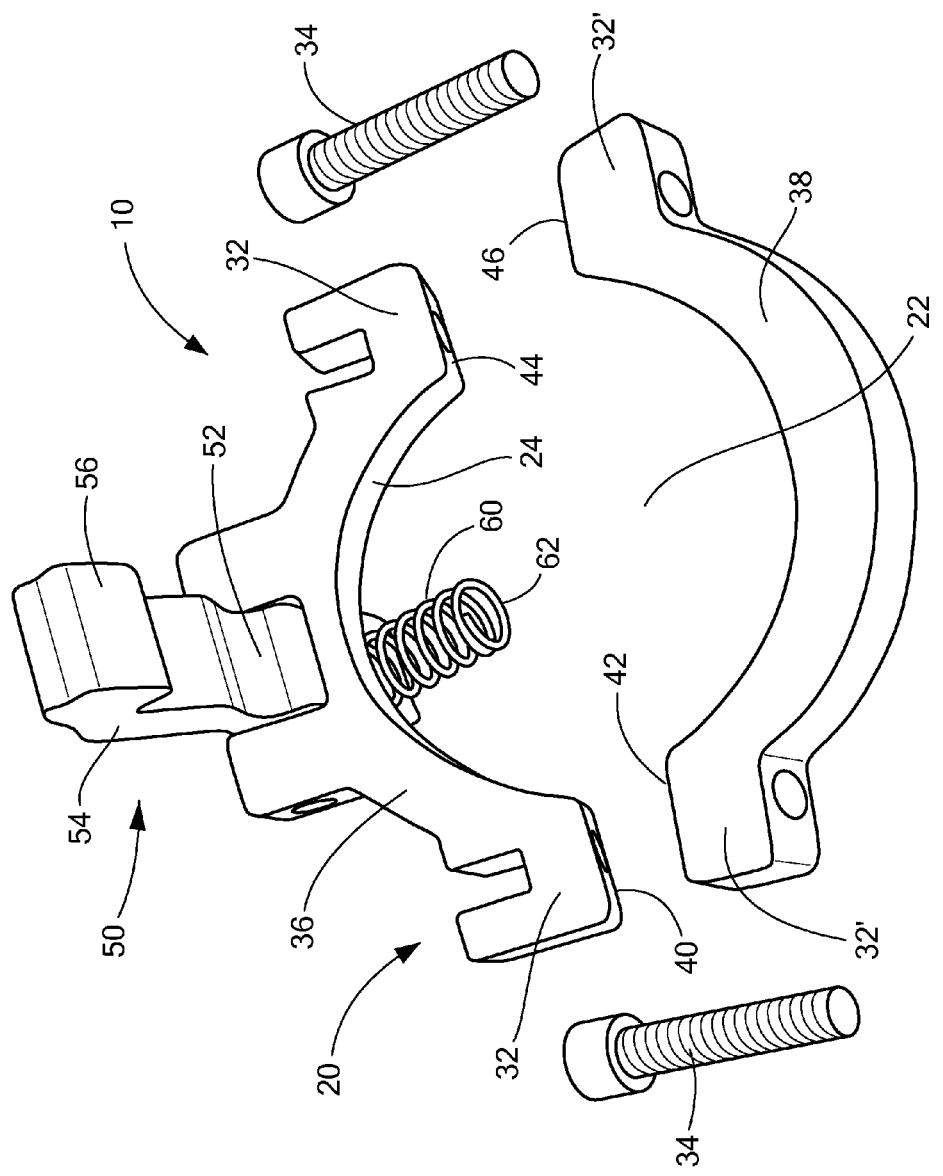
FIG. 2 is a perspective view of another connector according to an embodiment of the invention.
Figure 3:
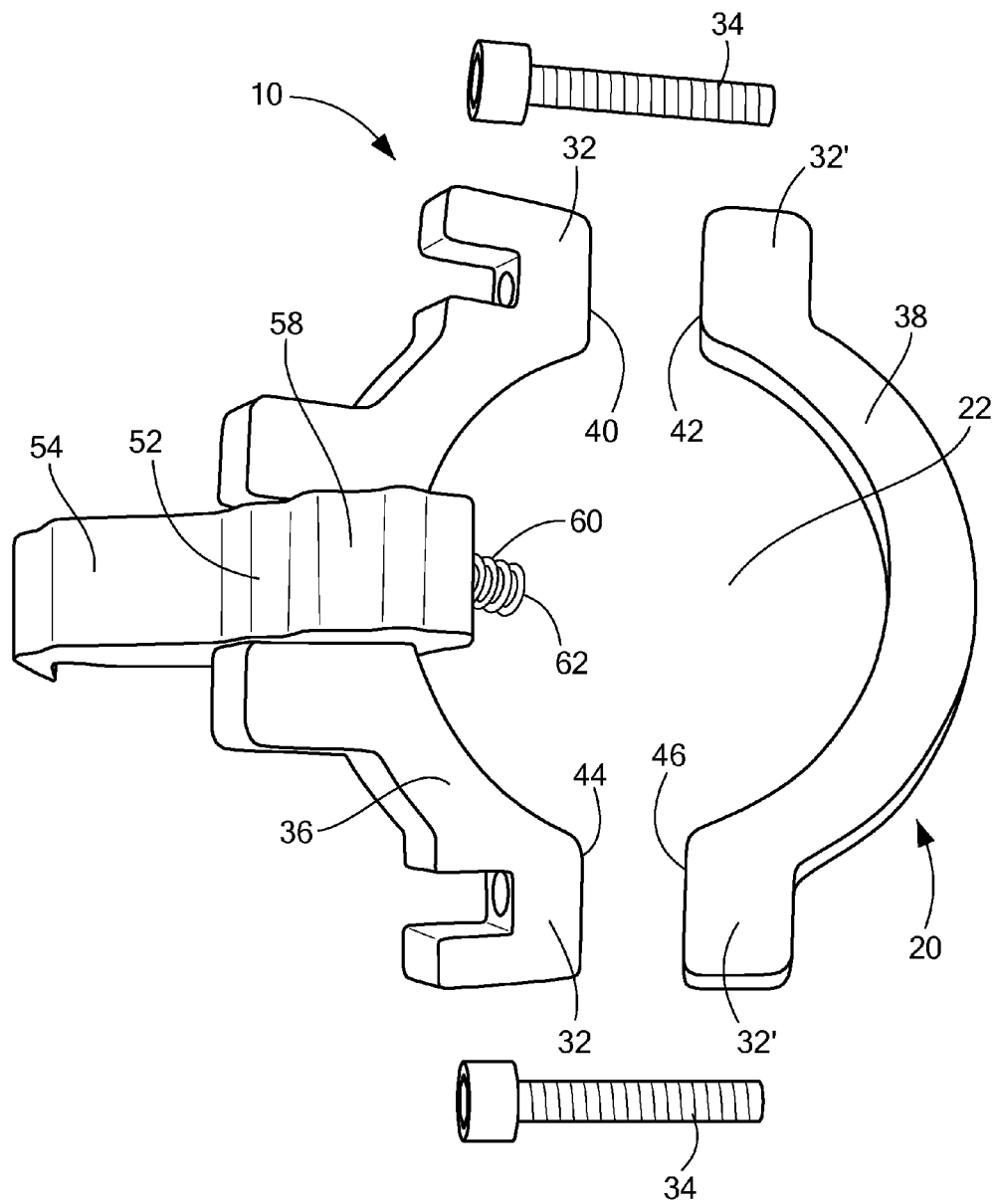
FIG. 3 is another perspective view of the connector illustrated in FIG. 2.

In another embodiment, illustrated in FIGS. 2 and 3, the connector body 20 includes multiple portions, such as a first portion 36 and a second portion 38 for example, that join together to substantially surround the periphery of the first hose end 12. Though the connector body 20 is shown having two portions, embodiments including any number of portions are within the scope of the invention. The first portion 36 includes a first end 40 configured to couple to a first end 42 of the second portion 38, and a second end 44 configured to couple to a second end 46 of the second portion 38. Arranged at each of the ends 40, 42, 44, 4 of the first and second portions 36, 38 of the connector body 20 are substantially identical flanges 32. The flanges 32 at the ends 40, 44 of the first portion 32 are arranged in pairs with the flanges 32' adjacent the ends 42, 46 of the second portion, respectively. Each pair of flanges 32, 32' is configured to receive a fastener 34, to couple the first and second portions 36, 38 of the connector body 20 while clamping the connector body 20 about the first hose end 12.

The connector body 20 additionally includes an arm 50 that extends generally perpendicularly from the plane of the connector body 20 (see FIGS. 1-3). A middle portion 52 of the arm 50 is pivotally mounted to connector body 20 with a pin P such that the arm 50 is configured to rotate in and out of the plane of the connector body 20. A front side 54 of the arm 50 extends away from the connector body 20 in the direction of the second hose end 14. In one embodiment, the front side 54 of the arm 50 has a general L-shape such that an end 56 thereof is bent at an angle, generally towards the connector body 20, in a plane substantially parallel to the plane of the connector body 20. End 56 is configured to engage a portion of the second hose end 14 to prevent movement thereof relative to the first hose end 12. A back side 58 of the arm 50 includes a biasing mechanism 60, such as a coil spring for example. The biasing mechanism 60 extends from the back side 58 of the arm 50 in the direction of the connector body 20.

Figure 4:
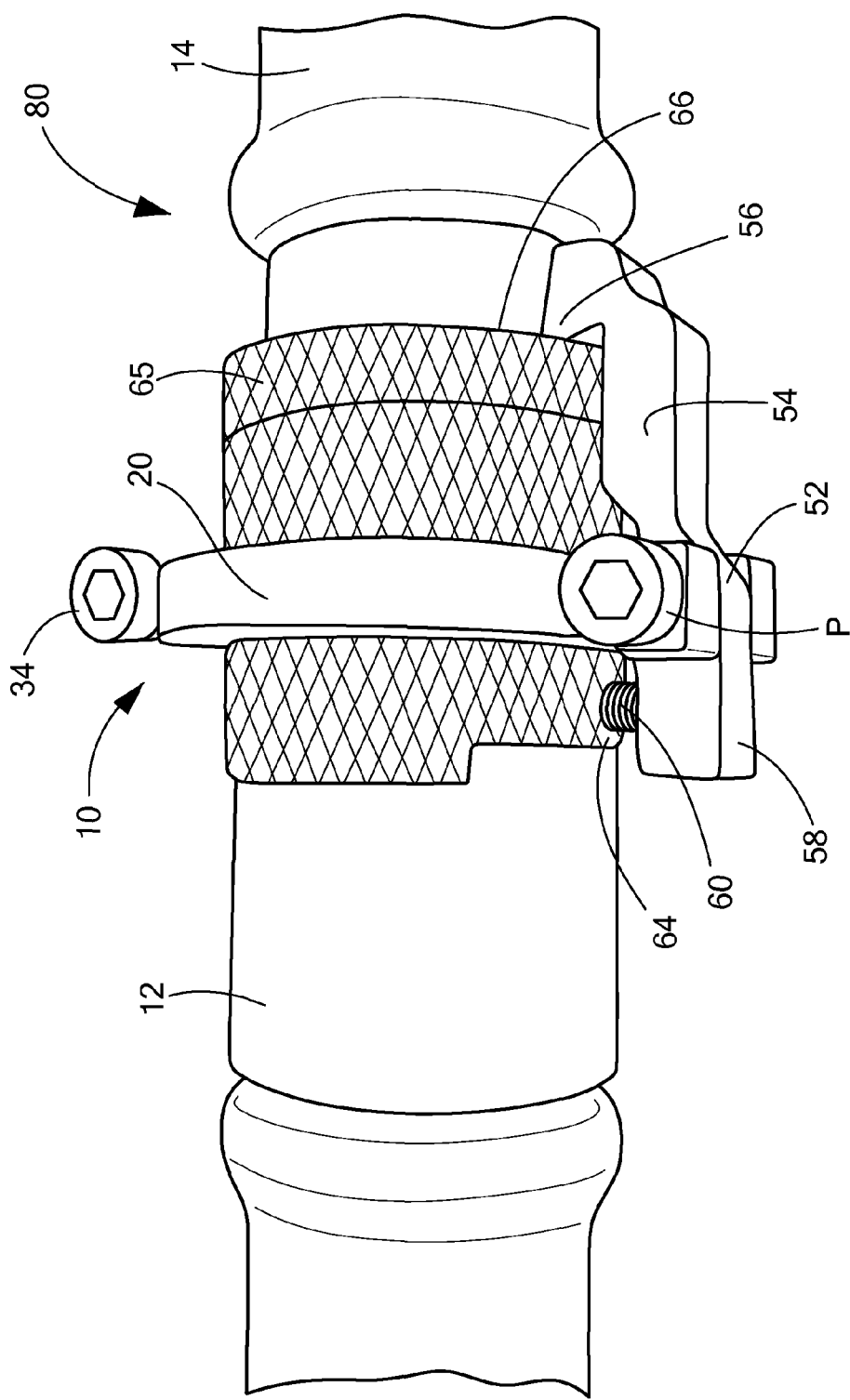
FIG. 4 is a perspective view of a hose assembly having a connector attached thereto according to an embodiment of the invention.

Referring now to FIG. 4, a hose assembly 80 including a coupled first hose end 12 and second hose end 14 is illustrated. The first and second hose ends 12, 14 may be coupled using a known coupling mechanism (not shown). In one embodiment, the connector 20 is installed at a fluid/air source output, wherein the second hose end extends from an air compressor. The connector 20 is mounted to the first hose end such that the connector body 20 is positioned substantially about the periphery of the first hose end 12. In the non-limiting illustrated embodiment, the connector body 20 is installed within a peripheral groove (not shown) of the first hose end 12; however, the connector body 20 may be positioned anywhere on the first hose end 12. When the connector is installed, the free end 62 of the biasing mechanism 60 extending from the back side 58 of the arm 50 contacts the surface 64 of the first hose end 12. By mounting the biasing mechanism 60 in this manner, the biasing mechanism 60 biases the arm 50 in the direction indicated by arrow A such that the front side 54 of the arm 50 engages a portion of the second hose end 14, such as a ledge 66 of the hose fastener 65 for example. The hose fastener 65 is disposed on a threaded coupling to lock the hoses together. Because the arm 50 is only configured to pivot about pin P, the engagement between the front side 54 of the arm 50 and the ledge 66 prevents movement of the hose fastener 65, and thus prevents movement of the second hose end 14 in a direction away from the first hose end 12 and the coupling mechanism.

To remove the connector 10 and decouple the first and second hose ends 12, 14, a force is applied to the back side 58 of the arm 50. Compressing the biasing mechanism 60 causes the arm 50 to pivot about pin P in the direction opposite the direction indicated by arrow A, and out of engagement with the second hose end 14. Once the arm 50 is rotated away from the ledge 66, the hose fastener 65 may be rotated to decouple the first and second hose end 12, 14.

Inclusion of the connector 20 on a coupled hose assembly prevents lateral movement of the second hose end 14 away from the first hose end 12 as a result of the vibration generated by the pressurized fluid flowing through the coupled hoses. Because the first and second hose ends 12, 14 are no longer able to separate, the possibility of the hoses flailing is minimized.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A connector for use with a coupled first hose and second hose, the second hose including a hose fastener disposed on a threaded coupling to connect the first hose and the second hose, the connector comprising:
  a connector body configured to mount to a first hose end, wherein at least one mechanical fastener is configured to secure the connector body to the first hose end;
  an arm extending perpendicularly from the connector body, a front side of the arm having a first arm end bent at a first angle towards the connector body and at a second angle relative to the arm and being configured to engage a ledge on a distal end of the hose fastener, and a back side of the arm opposite the first arm end;
  a pivot coupling the arm to the connector body, the pivot being disposed between the first arm end and the back side; and
  a spring disposed between a surface of the first hose end and the back side, the spring arranged to bias the arm about the pivot to engage the first arm end with the ledge to prevent rotation of the hose fastener on the threaded coupling.

2. The connector according to claim 1, wherein the arm is configured to rotate in and out of a plane of the connector body.

3. The connector according to claim 1, wherein the connector body is configured to substantially surround a periphery of the first hose end.

4. The connector according to claim 3, wherein the connector body includes a central hole through which the first hose end extends.

5. The connector according to claim 4, wherein a contour of the central hole is complementary to a shape of the first hose end.

6. The connector according to claim 5, wherein a portion of an interior surface of the connector body is configured to contact the first hose end.

7. The connector according to claim 3, wherein the connector body is formed from multiple portions that when joined substantially surround the periphery of the first hose end.

8. The connector according to claim 7, wherein the connector body is formed from a first portion and a second portion.

9. A hose assembly comprising:
  a first hose end;
  a second hose end including a hose fastener disposed on a threaded coupling to connect the first hose end and the second hose end; and
  a connector mounted to the first hose end, the connector including:
    a connector body attached to the first hose end, wherein at least one mechanical fastener secures the connector body to the first hose end;
    an arm extending perpendicularly from the connector body, the arm includes a front side having a first arm end bent at an angle towards the connector body, the first arm end being configured to engage a ledge on a distal end of the hose fastener, and a back side of the arm opposite the first arm end;
    a pivot coupling the arm to the connector body, the pivot being disposed between the first arm end and the back side; and
    a spring disposed between a surface of the first hose end and the back side, wherein the spring is arranged to bias the arm about the pivot to engage the first arm end with the ledge to prevent rotation of the hose fastener on the threaded coupling.

10. The hose assembly according to claim 9, wherein the arm is configured to rotate in and out of a plane of the connector body.

11. The hose assembly according to claim 9, wherein the first arm end of the front side of the arm disengages from the ledge of the hose fastener when a force is applied to the back side of the arm.

12. The hose assembly according to claim 9, wherein the connector body is configured to substantially surround a periphery of the first hose end.

13. The hose assembly according to claim 12, wherein the connector body is formed from multiple portions that when joined substantially surround the periphery of the first hose end.

14. The hose assembly according to claim 12, wherein the connector body includes a central hole through which the first hose end extends.

15. The hose assembly according to claim 14, wherein a contour of the central hole is complementary to a shape of the first hose end.

16. The hose assembly according to claim 15, wherein a portion of an interior surface of the connector body is configured to contact the first hose end.

* * * * *